United States Patent [19]

Huguenin

[11] Patent Number: 5,667,723
[45] Date of Patent: Sep. 16, 1997

[54] LUMINOPHORES COMPRISING DOPED TANTALATES OF YTTRIUM/LUTETIUM/GADOLINIUM

[75] Inventor: Denis Huguenin, Asnieres-Sur-Seine, France

[73] Assignee: Rhone-Poulenc Chimie, Courbevoie Cedex, France

[21] Appl. No.: 498,262

[22] Filed: Jul. 3, 1995

[30] Foreign Application Priority Data

Jul. 1, 1994 [FR] France .................... 94 08149

[51] Int. Cl.$^6$ .................................................. H01J 1/62
[52] U.S. Cl. .................................. 252/301.4 R; 445/24; 313/483; 313/503; 345/45; 345/74; 345/76
[58] Field of Search .................. 445/24; 423/593; 252/301.4 R; 313/483, 503; 345/45, 74, 76

[56] References Cited

U.S. PATENT DOCUMENTS 4,024,069  5/1977  Larach ................. 252/301.4 R
4,225,653  9/1980  Brixner ................. 252/301.4 R

OTHER PUBLICATIONS

Database WPI, Section Ch, Week 8247, Derwent Publications Ltd., London, GB; Class L03, AN 82–01258J & JP–A–57 168 982 (Nippon Electric KK) Oct. 18, 1982.

Chemical Abstracts, vol. 116, No. 18, May 4, 1992, Columbus, Ohio; abstract No. 185250, T. Minamidani & AI, vol. 18, 1991, pp. 104–105.

*Primary Examiner*—Melissa Bonner
*Attorney, Agent, or Firm*—Burns, Doane, Swecker & Mathis, L.L.P.

[57] ABSTRACT

Particulates of a luminophore comprising a doped tantalate of yttrium, lutetium or gadolinium are well suited for low-voltage applications, e.g., for the manufacture of field emission display screens.

18 Claims, No Drawings

LUMINOPHORES COMPRISING DOPED TANTALATES OF YTTRIUM/LUTETIUM/GADOLINIUM

BACKGROUND OF THE INVENTION

1. Technical Field of the Invention

The present invention relates to unique luminophores comprising doped tantalates of yttrium, lutetium or gadolinium, to luminescent compositions comprised thereof, and to low-voltage luminescing electronic devices incorporating such luminophores/luminescent compositions.

2. Description of the Prior Art

It is known to the electronics arts that cathode ray tubes operate using a substantial level of energy, on the order of 30,000 V. It would be desirable, however, to employ lower levels of energy for such applications, namely, on the order of from 200 to 800 V. This is the case in respect of field emission displays (FED). Such equipment comprises metallic microdots which emit the low-energy electrons to excite a luminophorous material which is disposed on the display screen.

That luminophorous material must have two essential properties.

It must first have adequate optical characteristics, associated with its luminescence properties, and it must emit effectively in the desired color range.

The second required property is electrical conductivity. The material must indeed dissipate electrical charges when used for the aforesaid application.

Few materials exist which combine these two properties to an adequate degree. Indeed, luminous effectiveness of the material decreases with excitation potential. In addition, there is a minimum excitation potential (Vamin), below which the material no longer exhibits conductivity. Given the desirability to operate at a potential range which is as low as possible, on the order of from 200 to 800 V as indicated above, serious need continues to exist for materials which have the lowest possible Vamin while retaining adequate luminous effectiveness.

SUMMARY OF THE INVENTION

Accordingly, a major object of the present invention is the provision of unique luminophores having both adequate luminous effectiveness and conductivity in the operating voltage range of 200 to 800 V.

Briefly, the present invention features unique luminophores comprising low-energy luminescing, doped yttrium, lutetium or gadolinium tantalates.

This invention also features luminescent compositions comprising the aforesaid doped tantalate luminophores, as well as low-voltage luminescing electronic devices incorporating said luminophores/luminescent compositions.

DETAILED DESCRIPTION OF BEST MODE AND PREFERRED EMBODIMENTS OF THE INVENTION

More particularly according to the present invention, the base tantalates are the tantalates of yttrium, lutetium or gadolinium. In addition, these tantalates are doped. The doping is advantageously carried out by partial substitution either of the tantalum atoms, or of the yttrium, lutetium or gadolinium atoms.

Suitable doping agents, or dopants, for the substitution of tantalum include pentavalent elements, such as niobium.

Suitable dopants for the substitution of yttrium, lutetium or gadolinium are the rare earths that are luminescent in the visible range. Exemplary thereof are praseodymium, europium, terbium and thulium.

This invention also features mixed tantalates, comprising tantalum, which is optionally doped, and, other than the yttrium, lutetium or gadolinium, at least one other element selected from said three elements as well as lanthanum and europium, and optionally at least one doping element which is preferably selected from among the rare earths which are luminescent in the visible range. Mixed tantalates of yttrium/lutetium are exemplary thereof.

The amount of dopant and, in particular, of the rare earth which is luminescent in the visible range, is generally at most 20% and preferably at most 15%.

Compounds having a monoclinic structure M are the preferred.

Particularly representative tantalates according to the present invention are as follows:

As blue luminophores, those of formula (1) $YNb_xTa_{1-x}O_4$, wherein x is greater than 0 and at most equal to 0.15; those of formula (2) $LuNb_xTa_{1-x}O_4$, wherein x is greater than 0 and at most equal to 0.2; those of formula (3) $Y_{1-y}Tm_yTaO_4$, wherein is greater than 0 and at most equal to 0.03. Solid solutions of the compounds of formulae (1) and (2) or (1) and (3) are also intended.

As green luminophores, those of formula (4) $Y_{1-y}Tb_yTaO_4$, wherein is at least equal to 0.001 and at most equal to 0.15; those of formula (5) $Lu_{1-y}Tb_yTaO_4$, wherein y is at least equal to 0.001 and at most equal to 0.15; those of formula (6) $Gd_{1-y}Tb_yTaO_4$, wherein y is at least equal to 0.001 and at most equal to 0.15. Solid solutions of at least two of the three compounds of the formulae (4) to (6) are also intended.

Preferably, these materials have mean particle sizes of at most 15 µm, preferably at most 5 µm (CILAS granulometry).

The subject products are prepared via techniques which are well known to this art. The usual procedure comprises solid state reaction of the oxides of the respective elements of the composition, optionally in the presence of a flux comprising an alkali metal such as lithium, or an alkaline earth metal such as barium.

The present invention also features electronic devices or apparatus operating by low-voltage luminescence, and which incorporate a doped tantalate of yttrium, lutetium or gadolinium as described type.

In such devices/apparatus, the tantalates are disposed on screens which are subjected to low-energy excitation. That use of the luminophores in the manufacture of apparatus operating by low-voltage luminescence is carried out by any known means, for example by deposition onto the screens by means of screen printing, sedimentation or electrophoresis.

This invention is especially applicable for apparatus comprising a field emission display screen.

In order to further illustrate the present invention and the advantages thereof, the following specific examples are given, it being understood that same are intended only as illustrative and in nowise limitative.

In said examples to follow, the luminescence properties of the products described were measured by low-voltage cathodoluminescence of the products which were deposited by sedimentation without binder onto a substrate which was transparent under the conditions of excitation involving 1 µA/mm² in respect of direct current. The thickness of the layer of product on the substrate was 10 µm.

EXAMPLE 1

In this example, a yttrium tantalate was employed, comprising niobium, and having a mean particle size of 10 µm and the formula $YTa_{0.99}Nb_{0.01}O_4$.

The product emitted a blue luminescence. It had a level of luminous effectiveness of 0.2 Lm/W at 400 V and a Vamin of less than 200 V.

EXAMPLE 2

In this example, a lutetium tantalate of the formula $LuTa_{0.99}Nb_{0.0}O_4$ was employed.

It had a level of luminous effectiveness of 0.12 Lm/W at 400 V and a Vamin of less than 200 V. Its colorimetric coordinates were x=0.146 and y=0.069. Its mean particle size was 5 µm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a low-voltage luminescing electronic device/apparatus, the improvement which comprises, as the luminophore therefor, luminophore particulates comprising a doped tantalate of yttrium, lutetium or gadolinium, the tantalum atoms of which having been partially replaced by a dopant amount of niobium atoms.

2. The luminophore particulates as defined by claim 1, the yttrium, lutetium or gadolinium atoms of which having been partially replaced by a dopant amount of atoms of a rare earth that luminesces in the visible range.

3. The luminophore particulates as defined by claim 2, said rare earth that luminesces in the visible range comprising praseodymium, europium, terbium or thulium.

4. The luminophore particulates as defined by claim 1, comprising a doped mixed tantalate.

5. The luminophore particulates as defined by claim 4, said doped mixed tantalate comprising at least two of the elements yttrium, lutetium, gadolinium, lanthanum and europium.

6. The luminophore particulates as defined by claim 5, comprising a dopant amount of atoms of a rare earth that luminesces in the visible range.

7. The luminophore particulates as defined by claim 1, having the formula $LuNb_xTa_{1-x}O_4$, wherein x is greater than 0 and at most 0.2.

8. The luminophore particulates as defined by claim 1, having the formula $Y_{1-y}Tm_yTaO_4$, wherein y is greater than 0 and at most 0.03.

9. The luminophore particulates as defined by claim 1, having the formula $Y_{1-y}Tb_yTaO_4$, wherein y is greater than 0 and at most 0.15.

10. The luminophore particulates as defined by claim 1, having the formula $Lu_{1-y}Tb_yTaO_4$, wherein y is greater than 0 and at most 0.15.

11. The luminophore particulates as defined by claim 1, having the formula $Gd_{1-y}Tb_yTaO_4$, wherein y is greater than 0 and at most 0.15.

12. The luminophore particulates as defined by claim 1, having a particle size of at most 15 µm.

13. The luminophore particulates as defined by claim 1, comprising a green luminophore.

14. The luminophore particulates as defined by claim 1, comprising a blue luminophore.

15. The low-voltage luminescing electronic device/apparatus as defined by claim 1, comprising a field emission display screen.

16. The low-voltage luminescing electronic device/apparatus as defined by claim 1, wherein the device/apparatus operates in a voltage range of 200 to 800 V.

17. The low-voltage luminescing electronic device/apparatus as defined by claim 1, wherein the luminescing particles have been deposited on a screen of the device/apparatus by screen printing, sedimentation or electrophoresis.

18. In a low-voltage luminescing electronic device/apparatus, the improvement which comprises, as the luminophore therefor, luminophore particulates comprising a doped tantalate of yttrium, lutetium or gadolinium, having the formula having the formula $YNb_xTa_{1-x}O_4$, wherein x is greater than 0 and at most 0.15.

* * * * *